United States Patent
Chen

(10) Patent No.: US 6,288,883 B1
(45) Date of Patent: Sep. 11, 2001

(54) POWER INPUT PROTECTION CIRCUIT

(75) Inventor: William I. H. Chen, Bedford, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/130,734

(22) Filed: Aug. 7, 1998

(51) Int. Cl.[7] .................................................. H02H 9/00
(52) U.S. Cl. ............................................................... 361/58
(58) Field of Search ........................... 361/18, 93.1, 93.7, 361/30, 58, 79, 91.1, 91.2, 90, 98, 100, 101, 119

(56) References Cited

U.S. PATENT DOCUMENTS

| | | | |
|---|---|---|---|
| 4,757,433 | * | 7/1988 | Santelmann, Jr. ....................... 363/19 |
| 5,444,595 | * | 8/1995 | Ishikawa et al. ........................ 361/86 |
| 5,706,157 | * | 1/1998 | Galecki et al. .......................... 361/63 |
| 5,768,368 | * | 6/1998 | Koenig et al. ......................... 379/418 |

* cited by examiner

Primary Examiner—Ronald W. Leja

(74) Attorney, Agent, or Firm—Jones, Day, Reavis & Pogue

(57) ABSTRACT

A power input protection circuit for an electrical device including a pass device having a full-conduction state, an off state, and a current regulation state, a control device coupled to the pass device for signaling the pass device to operate in one of the full-conduction, off or current regulation states, a high-voltage sensing circuit coupled to the control device for signaling the presence of an over-voltage condition to the control device, a high-current sensing circuit coupled to the control device for signaling the presence of an over-current condition to the control device, and an energy storage circuit coupled to the regulator and for supplying energy to the regulator when the pass device is in the off state is disclosed. In one embodiment the high-current sensing circuit comprises an input current sensor having a first input and a second input, a second voltage reference coupled to the first input, and a current measuring circuit coupled to the second input and the high-voltage sensing circuit comprises an input voltage sensor having a first input and a second input, a first voltage reference coupled to the first input, and an input voltage measuring circuit coupled to the second input. The pass device blocks the flow of current through the voltage regulator when the pass device is in the off state and limits the flow of current through the voltage regulator when the pass device is in the current regulation state.

22 Claims, 2 Drawing Sheets

POWER INPUT PROTECTION CIRCUIT

BACKGROUND OF THE INVENTION

The present invention is directed toward the field of power input protection circuits for power supplies. In particular, a power input protection circuit is disclosed for use with remotely powered electronic devices. The present invention protects remotely powered electronic devices from hazards such as lightning strikes and power cross conditions by limiting the amount of voltage and current the remotely powered electronic device can be subjected to.

In remotely powered electronic devices, the high-voltage power lines from the local utility company are often the primary source of input power for the device. The remotely powered electronic devices must be able to accept the power supplied by the high-voltage power lines and convert it to lower d.c. voltage levels that are compatible with the electronic components within the remotely powered electronic device.

An exemplary remotely powered electronic device is an Optical Network Unit ("ONU"). An ONU is a device that is used as an interface between fiber optic telecommunication lines and traditional wires used to provide telecommunication services such as cable television and telephonic services to homes or other buildings.

The power supply in an ONU receives high-voltage d.c. power from the local telephone company and converts it to lower level d.c. voltages for use by other circuitry within the ONU. The power supply in an ONU typically includes: (i) input protection and filter circuitry; (ii) energy storage circuitry, (iii) input voltage monitors and threshold circuitry, (iv) d.c. to d.c. converters; (v) ringing generators, and (vi) alarm and digital interface circuitry.

The ONU, a remotely powered electronic device, is provided with power through a long pair of telephone wires of up to 6000 feet long The long power input wires are susceptible to hazards such as high-voltage lightning strikes and power cross conditions resulting from power lines falling across power input wires. As a result, the ONU could be subjected to around 600 volt R.M.S. power surges which, if adequate input protection circuitry is not provided, could damage circuitry within the ONU.

Primary protection gas tubes are used to limit the amplitude of any high-voltage surge to ±1000 volts before the connection to the power supply. The input protection and filter circuitry, therefore, must be capable of handling high-voltage surges of up to 1000 volts to protect both the circuitry within the power supply unit and the other circuitry within the ONU. The present invention provides an input protection circuit that allows the circuitry within the ONU to survive after a lightning strike or power cross condition and to prevent the ONU from being destroyed if such a condition occurs. Also, many of the components within the ONU could be damaged by excessive current flow. Therefore, the present invention provides an input protection circuit that limits the flow of current.

Presently known methods for providing power input protection circuits include the circuit disclosed in FIG. 1. In this figure, input power is provided across input lines 1 and 2. A diode bridge network 3 receives the input power, rectifies it, and outputs the rectified input voltage at nodes 4 and 5. Series resistors 6 and 7 are provided between rectifier nodes 4 and 5 and the clamped output nodes 9 and 10, which serve as the input power connection points for the remainder of the power supply. A zener diode 8, such as an 150 volt zener diode, is bridged across clamped output nodes 9 and 10. When the input lines are subjected to voltages of up to 1000 volts, the zener diode 8 will allow the voltage supplied at clamped output nodes 9 and 10 to exceed 150 volts. The series resistors 6 and 7 will sustain the extra voltage applied across input lines 1 and 2 and pass the current.

This technique, shown in FIG. 1 is disadvantaged, first of all, because it requires sizeable series resistors 6 and 7 to sustain the extra voltage. Proper ventilation and heat sinking will be needed to dissipate the heat generated in resistors 6 and 7. If this circuitry were used in the ONU, for example, a 5.2 Ω, 10 to 20 W resistor would be required per line. Another disadvantage of this method is inefficiency, Because the ONU draws approximately 0.5 Amps of current during normal operation, a lot of wasted power will be dissipated in the series resistors 6 and 7 during normal operation of the ONU Assuming the 5.2 Ω resistors noted above are used in the ONU, approximately 2.6 Watts of power would be dissipated in series resistors 6 and 7. Yet another disadvantage is the inefficiency caused by the power loss in the diode bridge network 3. The diode bridge 3 inserts two diodes in series during normal operation of the ONU. Each diode drops 1 volt resulting in an additional 1 W of wasted power that could otherwise be used for telecommunication services in the ONU.

Therefore, there remains a need in this art for a more efficient power input protection circuit. There remains a more particular need for an efficient power input protection circuit that does not require sizeable resistors to sustain excess voltage and the attendant ventilation and heat sinking requirements. In addition, there remains a more particular need for an efficient power input protection circuit that also provides a mechanism for limiting the flow of current through the power supply.

SUMMARY OF THE INVENTION

The present invention overcomes the problems noted above and satisfies the needs in this field for a power input protection circuit for a remotely located electronic device. The power input protection circuit provides an active switch circuit that senses when an over-voltage or over-current condition has occurred and disconnects the power input lines when an over-voltage condition occurs and limits the flow of current when an over-current condition occurs. The input protection circuit includes a pass device that operates in at least an on state and an off state. The pass device passes input voltage when the pass device is in the on state and blocks input voltage when the pass device is in the off state. The input protection circuit can also include a control device for causing the pass device to change to any one of the on or off states. The pass device can also be provided with a current limiting state in which the current flowing is limited by the pass device. The input protection circuit can also be provided with a high voltage control circuit for sensing an over-voltage condition and signaling the control device to cause said the device to change to the off state. The input protection circuit can also be provided with a current limiting control circuit for sensing an over-current condition and signaling the control device to cause the pass device to change to the current limiting state.

As will be appreciated, the invention is capable of other and different embodiments, and its several details are capable of modifications in various respects, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
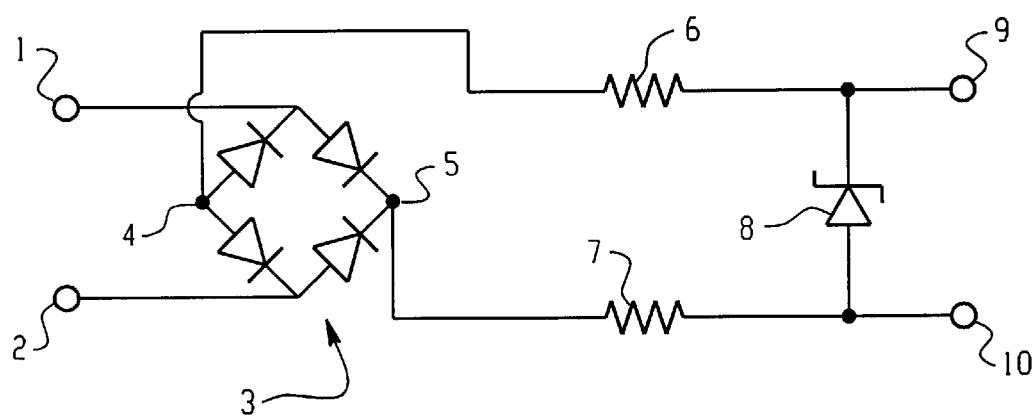
FIG. 1 is a circuit diagram of a presently known power input protection circuit.
Figure 2:
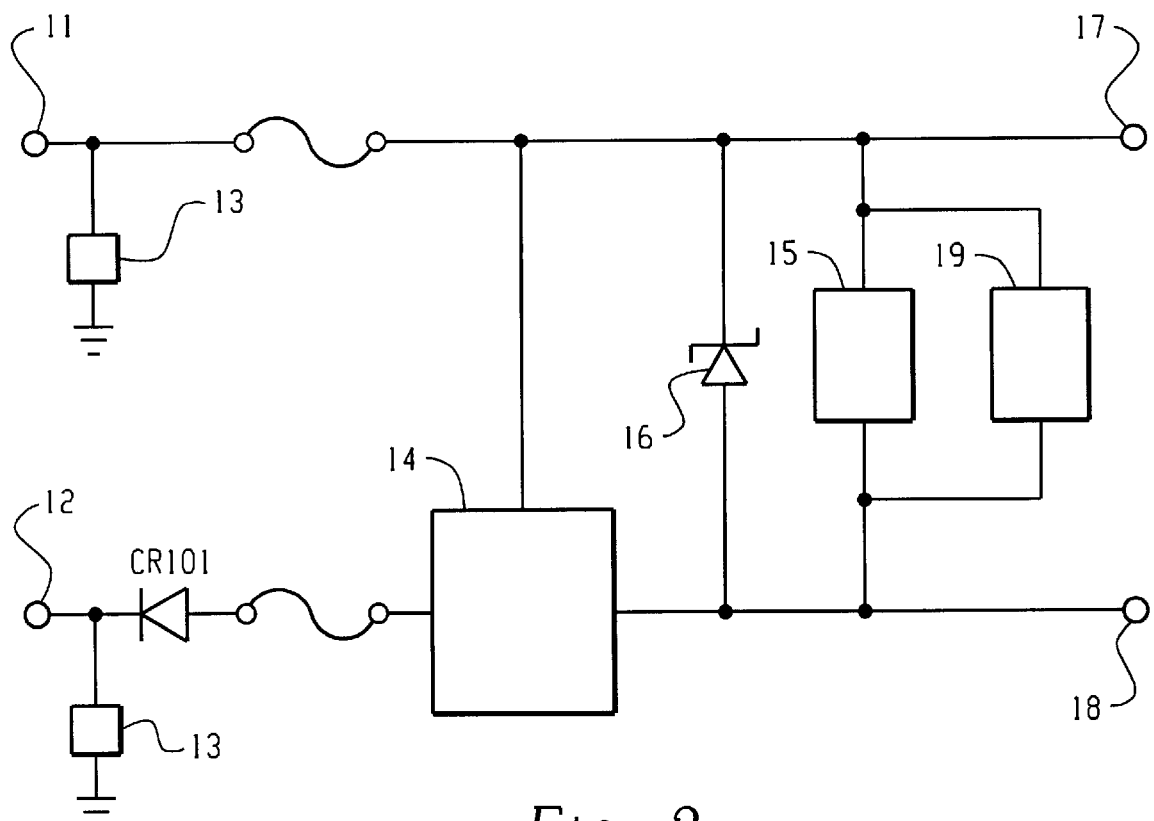
FIG. 2 is a block diagram of a preferred embodiment of the power input protection circuit of the present invention

Referring now to the drawings, FIG. 2 sets forth a block diagram of a preferred embodiment of the power input protection circuit. For purposes of our discussion of the invention it is assumed that the power input protection circuit is part of an ONU device, although it could be part of any remotely powered electronic device. Input power is provided to the ONU from a high voltage d.c. power source through a powering wire pair (not shown). The powering wire pair is subject to lightning, power-cross and 60 Hz induction. Primary protection means 13 in the ONU limits the amplitude of these disturbances to ±1000 volts before connection to the power supply. The preferred primary protection means 13 are gas tubes but other means such as carbon blocks or solid state primary protectors could be used. The input protection circuit 14 protects the power supply from transients up to ±1000 volts. Protection circuit 14 disconnects the internal electronic circuits from the input terminals 11, 12 whenever the input differential voltage exceeds a predetermined level or when the input power polarity is reversed, due to transients or wiring error. In the preferred embodiment the predetermined level is about 161 volts. Protection circuit 14 also limits the input current to a second predetermined level to prevent high charging currents into energy storage circuit 15. In the preferred embodiment the second predetermined level is about 560 mA and energy storage circuit 15 comprises capacitors although other storage devices such as batteries could be used. Fail safe device 16 is a backup protector in case input protection circuit 14 fails. In the preferred embodiment fail safe device 16 is a zener diode although other means such as a regulator integrated circuit could be used.

Energy storage circuit 15 is provided to temporarily provide power to the ONU when protection circuit 14 disconnects the internal electronic circuits from the input terminals 11, 12 during a transient. Also provided is a discharge circuit 19 that insures that the energy storage circuit 15 is discharged, within about one second, to prevent electrical shock hazards when the circuit board containing the energy storage circuit 15 is removed from the ONU. The discharge circuit 19 is disabled when the circuit board containing the energy storage circuit 15 is installed in the ONU to avoid the activation of the discharge due to transient low or reversed line voltage conditions.

Figure 3:
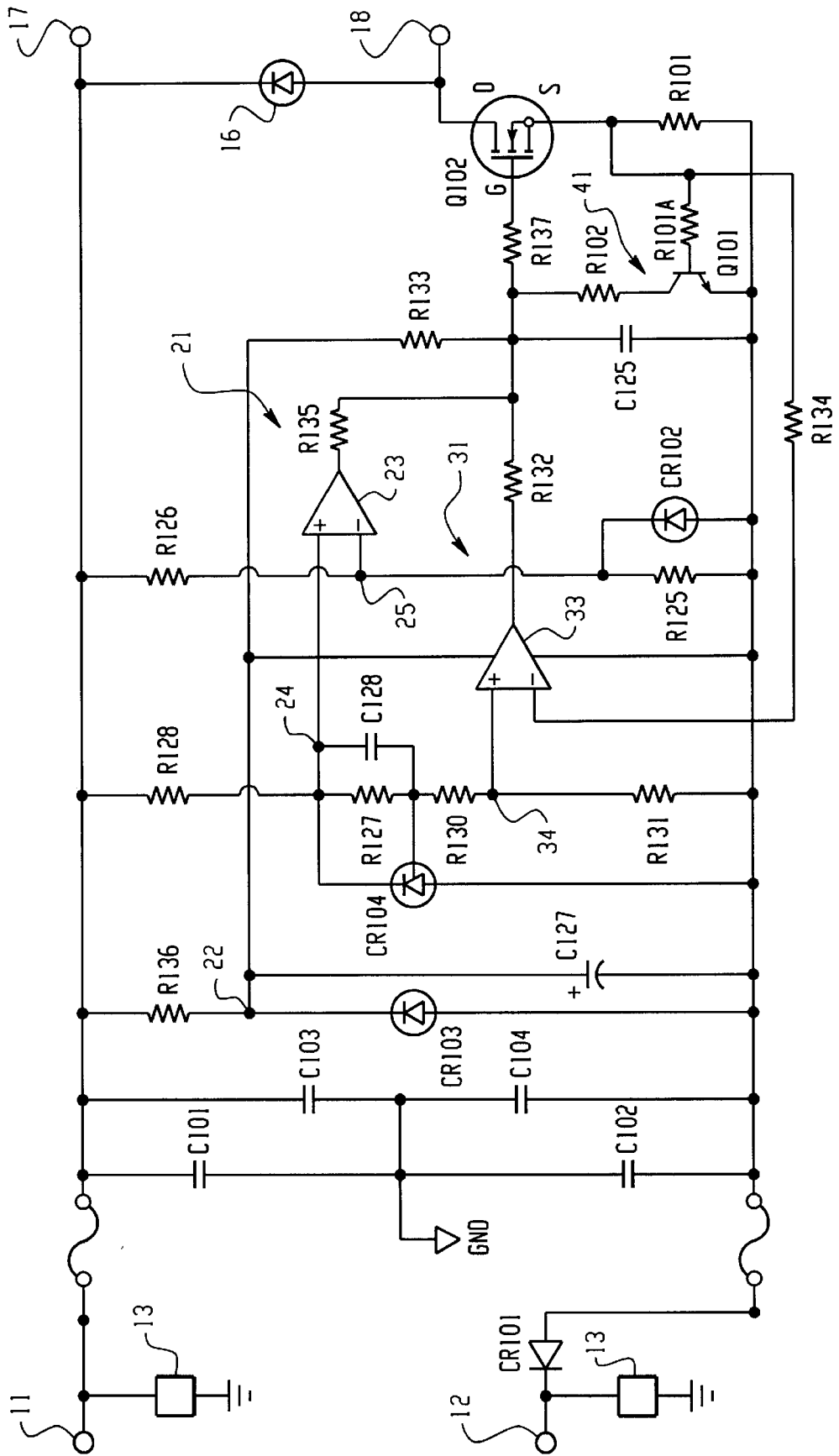
FIG. 3 is a more detailed circuit schematic of the power input protection circuit of FIG. 2 showing the high-voltage protection circuitry and the input current limiter circuitry.

Referring now to FIG. 3, pass device Q102 is the main device in the input protection circuit 14. It acts as a high voltage cut-off device as well as a high input current limiting device. In the preferred embodiment pass device Q102 is a 1000 volt MOSFET, device IRFPG50, but can be any device that has high voltage blocking capability and low on-resistance such as an IGBT. The on-resistance of the preferred pass device is approximately 1.5 Ω. Pass device Q102 is capable of operating in at least an on or full-conduction state an off state, and a current limiting state. The state of pass device Q102 is determined by the voltage applied at its input gate g. In the preferred embodiment, the voltage at gate g is determined by the voltage across control device C125. Control device C125 in the preferred embodiment is a 0.01 uF capacitor although any device capable of supplying multiple voltage levels such as an op amp or resistor could be used.

When control device C125 is at the on-voltage level, 10 volt in the preferred embodiment, pass device Q102 is in the full-conduction state with a low on-resistance. When control device C125 is at the off-voltage level, approximately 0 volts in the preferred embodiment, pass device Q102 stops conducting, and pass device Q102 disconnects the internal electronic circuits from the input terminals 11, 12. When control device C125 is at the current regulation voltage level, near 4 volts in the preferred embodiment, pass device Q102 is in the active state, and functions as a current regulator.

In the normal operating state, control device C125 is at the on-voltage level. In the preferred embodiment the voltage on capacitor C125 is pulled up to 10 volts through resistor R133 which has a preferred value of 100 KΩ. As a result pass device Q102 is in the low resistance full-conduction state. In normal operation, input protection circuit 14 dissipates very little power as compared to prior art circuits.

During abnormal operating conditions, control device C125 is set by one of two separate sensing circuits or a fast current limiting circuit 41 to the appropriate voltage level to perform either the high voltage protection function or the input current limiting function. These circuits, high-voltage sensing circuit 21, high-current sensing circuit 31, and fast current limiting circuit 41, derive their power directly from the high voltage input. In order to conserve power, circuits 21, 31 and 41 must function with minimum current consumption. When the input voltage across input terminals 11, 12 exceeds a threshold, 161 volts in the preferred embodiment, high-voltage sensing circuit 21 forces control device C125 to reach the off-voltage level which, in turn, causes pass device Q102 to stop conducting and to disconnect the internal electronic circuits from the input terminals 11, 12.

When the current flowing through pass device Q102 exceeds a second threshold, 560 mA in the preferred embodiment, high-current sensing circuit 31, forces control device C125 to the current regulation voltage level, which, in turn, causes pass device Q102 to move to the active state and function as a current regulator. In both cases, fast current limiting circuit 41 acts quickly to limit the input current through pass device Q102 to 2.5 Amps until sensing circuits 21 and 31 can act to force control device C125 to either the off or current regulation voltage level.

A preferred high-voltage sensing circuit 21 comprises an on-voltage reference 22, input voltage sensor 23, first comparator voltage reference 24, and input voltage measurement means 25. A preferred high-current sensing circuit 31 comprises current measuring means R101, input current sensor 33, and second comparator voltage reference 34. A preferred fast current limiting circuit 41 comprises fast input current limiter means Q101.

The preferred on-voltage reference 22 comprises resistor R136, diode CR103 and capacitor C127. Resistor R136, diode CR103 and capacitor C127 provide a stable 10 volt supply when the input voltage is in the range of 60 volts to 1000 volts. Diode CR103, part number IN4740A, is chosen for its low minimum operating bias, 50 μA. Resistor R136 is a leaded resistor, chosen to sustain a 1000 volt surge. Capacitor C127 provides noise filtering.

In the preferred embodiment, first and second comparator voltage references 24 and 34 are formed by resistors R127, R128, R130, R131, capacitor C128, and device CR104. These elements are arranged to provide stable and accurate voltage references for input voltage sensor 23 and input current sensor 33. Device CR104, part number TLV431, is a low current, 80 µA, precision bandgap 1.245 volt reference. Capacitor C128 is a 1000 pf capacitor that provides high frequency bypass for resistor R127, a 280 KΩ resistor, to stabilize the feedback loop and reduce sensitivity to switching noises generated by the on board switch mode converters. Resistors R127, R128, R130, R131, capacitor C128, and device CR104 are arranged such that a 4.0 volt voltage reference 24 is provided for input voltage sensor 23, and a 0.14 volt voltage reference 34 is provided for input current sensor 33. The preferred input voltage sensor 23 and input current sensor 33 are comparator IC, model TLC393, each having a positive and negative input terminal and which is chosen for its low operating current of 65 µA. Resistor R128 is a 332 KΩ leaded resistor, chosen to sustain a 1000 volt surge. The output of the first and second voltage references 24 and 34 are applied to the positive input terminals of, respectively, input voltage sensor 23 and input current sensor 33. Resistors R130 and R131 are 14 KΩ and 110 KΩ, respectively. Although preferred component values and types are given, one skilled in the art could modify the component values and type without departing from the spirit of the invention.

In the embodiment disclosed, input voltage measurement means 25 comprises a voltage divider made up of resistors R125 and R126, which divides the input voltage by a factor of 40.2 to 1, and zener diode CR102, a 5.6 volt zener diode. Preferred values of R125 and R126 are 382 KΩ and 10 K, respectively. Current measuring means R101 comprises a 0.25 resistor that provides a voltage that is proportional to the current flowing through it.

The disclosed fast input current limiter means Q101 comprises transistor Q101, which in combination with resistors R102 and R101A sets control device C125 to a current regulation voltage level when a sufficient voltage has been sensed across current measuring means R101.

In operation a high current transient can occur when the power supply is first powered up, or occur as a part of changing input voltage During a fast high current input transient, a large current passes through pass device Q102 and current measuring means R101. When and if the input current exceeds 2.5 Amps, the voltage developed across current measuring means R101 exceeds 0.6 volts and fast input current limiter means Q101 starts conducting and quickly discharges control device C125 through resistor R102, preferably a 15 Ω resistor, to approximately 4 volts in about 0.2 µs. Base protection resistor R101A, preferably a 100 Ω resistor, limits the base current of fast input current limiter means Q101. In the meantime, the voltage at the negative input terminal of input sensor 33 exceeds the reference voltage at the positive input terminal and the comparator output at input current sensor 33 goes low. This in turn further discharges control device C125 to limit the input current to a steady 560 mA. When the limiting current drops below 2.5 Amps, the voltage across current measuring means R101 drops below 0.6 volts and fast input current limiter means Q101 stops conducting. Thus, the current limiting process occurs in two steps. Initially, fast input current limiter means Q101 quickly discharges control device C125 with a time constant of 0.2 µs. During this initial transient, input current is limited to approximately 2.5 Amps. The slower but precise limiting to 560 mA is accomplished by the input current sensor 33.

During a high voltage transient, a large current passes through pass device Q102 and current measuring means R101 due to the charging of energy storage circuit 15. When and if the input current exceeds 2.5 Amps, the voltage developed across current measuring means R101 exceeds 0.6 volts and fast input current limiter means Q101 starts conducting and quickly discharges control device C125 through resistor R102 to approximately 4 volts in about 0.2 µs. In the meantime when the input voltage reaches 161 volts, input voltage sensor 23 senses the event and acts to cut off pass device Q102. Resistors R125 and R126 divide the input voltage by a factor of 40.2 to 1 and zener diode CR102 limits the monitored voltage at the negative terminal of input voltage sensor 23 to 5.6 volts so it will stay within allowed voltage range during a high voltage input surge. When the input voltage is more than 161 volts, the monitored voltage at the negative terminal of input voltage sensor 23 is higher than the reference voltage at the positive input and the output of the input voltage sensor 23 goes low. This discharges control device C125 through resistor R135, preferably a 301 Å resistor, with a time constant of 3 µs to turn pass device Q102 off, from the active current limiting state to a cut-off state, Resistor R125 is a leaded resistor, chosen to sustain a 1000 volt surge.

Thus, the high-voltage limiting process can also occur in two steps. Initially, fast input current limiter means Q101 quickly discharges control device C125 with a time constant of 0.2 µs to limit current flow to about 2.5 Amps during a high voltage transient. The slower input voltage sensor 23 then cuts off pass device Q102 when the input voltage exceeds 161 V with a time constant of about 3.0 µs.

During the time that pass device Q102 is in cut-off, the stored energy in the Energy Storage circuit 15 supplies the power needs of the ONU, discharging in the process. When the high voltage transient is over, the Energy Storage circuit 15 is recharged by the available line current.

Also provided in the preferred embodiment are input diode CR101 and capacitors C101–C104. Input diode CR101 is a 1000 volt rectifying diode that prevents reverse current flow in the powering circuits. This also aids in trouble-shooting. Capacitors C101–C104 presents/balanced impedance to ground. These capacitors C101–C104 attenuate common-mode noise emissions. These capacitors C101–C104 are rated for 1000 volts because they must be capable of withstanding up to 1000 volts power input conditions.

An advantage of the present invention is efficiency. During normal power conditions, the input protection circuit 14 consumes less than 0.5 Watts of power as compared to 2.6 Watts in prior art methods. Additionally, only one diode is needed to protect against polarity reversal as compared to two diodes in prior art system resulting in an additional 0.5 Watt power saving.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed is:

1. A power input protection circuit for an electrical device having a load, said power input protection circuit comprising:
   a pass device for controlling the distribution of power from a remotely located power source to the load, said pass device having a full-conduction state, an off state, and a current regulation state, said pass device being operable to block the flow of current when said pass device is in said off state and being operable to limit the flow of current when said pass device is in said current regulation state;

a control device coupled to said pass device for signaling said pass device to operate in one of said full-conduction, off or current regulation states;

a high-voltage sensing circuit coupled to said control device for signaling the presence of an over-voltage condition to said control device and for causing said control device to signal said pass device to operate in said off state when said over-voltage condition is detected, said high-voltage sensing circuit further comprising an input voltage sensor having a first input and a second input, a first voltage reference coupled to said first input, and an input voltage measuring circuit coupled to said second input;

a high-current sensing circuit coupled to said control device for signaling the presence of an over-current condition to said control device and for causing said control device to signal said pass device to operate in said current regulation state when said over-current condition is detected, said high-current sensing circuit further comprising an input current sensor having a first input and a second input, a second voltage reference coupled to said first input, and a current measuring circuit coupled to said second input;

a fast current limiter circuit coupled to said control device for limiting the flow of current through said pass device, said fast current limiter circuit being operable to cause said pass device to limit the flow of current in response to a high-current condition before said high-current sensing circuit signals the presence of an over-current condition to said control device, said fast current limiter circuit also being operable to cause said pass device to limit the flow of current in response to a high-voltage condition before said high-voltage sensing circuit signals the presence of an over-voltage condition to said control device;

an energy storage circuit coupled to said pass device, said energy storage circuit being operable to supply energy to the load when said pass device is in said off state; and a discharge circuit coupled to said energy storage circuit for discharging said energy storage circuit when said energy storage circuit is removed from said electrical device.

2. A power input protection circuit for an electrical device having a load, said power input protection circuit comprising:

a pass device for controlling the distribution of power from a remotely located power source to the load, said pass device having a full-conduction state, an off state, and a current regulation state, said pass device being operable to block the flow of current when said pass device is in said off state and being operable to limit the flow of current when said pass device is in said current regulation state;

a control device coupled to said pass device for signaling said pass device to operate in one of said on, off or current regulation states;

a high-voltage sensing circuit coupled to said control device for signaling the presence of an over-voltage condition to said control device and for causing said control device to signal said pass device to operate in said off state when said over-voltage condition is detected;

a high-current sensing circuit coupled to said control device for signaling the presence of an over-current condition to said control device and for causing said control device to signal said pass device to operate in said current regulation state when said over-current condition is detected;

a fast current limiter circuit coupled to said control device for limiting the flow of current through said pass device, said fast current limiter circuit being operable to cause said pass device to limit the flow of current in response to a high-current condition before said high-current sensing circuit signals the presence of an over-current condition to said control device, said fast current limiter circuit also being operable to cause said pass device to limit the flow of current in response to a high-voltage condition before said high-voltage sensing circuit signals the presence of an over-voltage condition to said control device; and an energy storage circuit coupled to said pass device, said energy storage circuit being operable to supply energy to the load when said pass device is in said off state.

3. The power input protection circuit according to claim 2 wherein said high-voltage sensing circuit comprises:

input voltage sensor having a first input and a second input;

a first voltage reference coupled to said first input; and an input voltage measuring circuit coupled to said second input.

4. The power input protection circuit according to claim 3 wherein said input voltage sensor comprises a comparator.

5. The power input protection circuit according to claim 2 wherein said high-current sensing circuit comprises:

an input current sensor having a first input and a second input;

a second voltage reference coupled to said first input; and a current measuring circuit coupled to said second input.

6. The power input protection circuit according to claim 5 wherein said input current sensor comprises a comparator.

7. The power input protection circuit according to claim 2 further comprising a fail safe device coupled across the output of said power input protection circuit.

8. The power input protection circuit according to claim 2 wherein said energy storage circuit further comprises a capacitive element.

9. The power input protection circuit according to claim 2 wherein said energy storage circuit further comprises a battery.

10. The power input protection circuit according to claim 2 further comprising a discharge circuit coupled to said energy storage circuit for discharging said energy storage circuit when said energy storage circuit is removed from the electrical device.

11. A power input protection circuit for an electrical device having a load, said power input protection circuit comprising:

a pass device for controlling the distribution of power from a remotely located power source to the load, said pass device having a full-conduction state and an off state, said pass device being operable to block the flow of current when said pass device is in said off state;

a high-voltage sensing circuit coupled to said pass device for signaling the presence of an over-voltage condition to said pass device and for causing said pass device to operate in said off state when said over-voltage condition is detected; and a fast current limiter circuit coupled to said pass device for limiting the flow of current through said pass device, said fast current limiter circuit being operable to cause said pass device to limit the flow of current in response to a high-voltage condition before said high-voltage sensing circuit signals the presence of an over-voltage condition to said pass device.

12. The power input protection circuit according to claim 11 wherein said high-voltage sensing circuit comprises:
   an input voltage sensor having a first input and a second input;
   a first voltage reference coupled to said first input; and
   an input voltage measuring circuit coupled to said second input.

13. The power input protection circuit according to claim 12 wherein said input voltage sensor comprises a comparator.

14. The power input protection circuit according to claim 12 wherein said fast current limiter circuit comprises a BJT device.

15. The power input protection circuit according to claim 11 further comprising a control device coupled between said pass device and said high-voltage sensing circuit and coupled between said pass device and said fast current limiter circuit.

16. The power input protection circuit according to claim 11 further comprising an energy storage circuit coupled to said pass device, said energy storage circuit being operable to supply energy to the load when said pass device is in said off state.

17. A power input protection circuit for an electrical device having a load, said power input protection circuit comprising:
   a pass device for controlling the distribution of power from a remotely located power source to the load, said pass device having an full-conduction state and a current regulation state, said pass device being operable to limit the flow of current when said pass device is in said current regulation state;
   a high-current sensing circuit coupled to said pass device for signaling the presence of an over-current condition to said pass device and for causing said pass device to operate in said current regulation state when said over-current condition is detected; and
   a fast current limiter circuit coupled to said pass device for limiting the flow of current through said pass device, said fast current limiter circuit being operable to cause said pass device to limit the flow of current in response to a high-current condition before said high-current sensing circuit signals the presence of an over-current condition to said pass device.

18. The power input protection circuit according to claim 17 wherein said high-current sensing circuit comprises:
   an input current sensor having a first input and a second input;
   a second voltage reference coupled to said first input; and
   a current measuring circuit coupled to said second input.

19. The power input protection circuit according to claim 18 wherein said input current sensor comprises a comparator.

20. The power input protection circuit according to claim 17 further comprising a control device coupled between said pass device and said high-current sensing circuit and coupled between said pass device and said fast current limiter circuit.

21. An electrical device that is powered by a remotely located power source and that has a load, said electrical device comprising:

a pass device for controlling the distribution of power from the remotely located power source to the load, said pass device having a full-conduction state, an off state, and a current regulation state, said pass device being operable to block the flow of current when said pass device is in said off state and being operable to limit the flow of current when said pass device is in said current regulation state;

a control device coupled to said pass device for signaling said pass device to operate in one of said on, off or current regulation states;

a high-voltage sensing circuit coupled to said control device for signaling the presence of an over-voltage condition to said control device and for causing said control device to signal said pass device to operate in said off state when said over-voltage condition is detected;

a high-current sensing circuit coupled to said control device for signaling the presence of an over-current condition to said control device and for causing said control device to signal said pass device to operate in said current regulation state when said over-current condition is detected;

a fast current limiter circuit coupled to said control device for limiting the flow of current through said pass device, said fast current limiter circuit being operable to cause said pass device to limit the flow of current in response to a high-current condition before said high-current sensing circuit signals the presence of an over-current condition to said control device, said fast current limiter circuit also being operable to cause said pass device to limit the flow of current in response to a high-voltage condition before said high-voltage sensing circuit signals the presence of an over-voltage condition to said control device; and an energy storage circuit coupled to said pass device, said energy storage circuit being operable to supply energy to the load when said pass device is in said off state.

22. An Optical Network Unit (ONU) device that is powered by a remotely located power source and that has a load, said ONU device comprising:
   a pass device for controlling the distribution of power from the remotely located power source to the load, said pass device having a full-conduction state, an off state, and a current regulation state, said pass device being operable to block the flow of current when said pass device is in said off state and being operable to limit the flow of current when said pass device is in said current regulation state;
   a control device coupled to said pass device for signaling said pass device to operate in one of said on, off or current regulation states;
   a high-voltage sensing circuit coupled to said control device for signaling the presence of an over-voltage condition to said control device and for causing said control device to signal said pass device to operate in said off state when said over-voltage condition is detected;
   a high-current sensing circuit coupled to said control device for signaling the presence of an over-current condition to said control device and for causing said control device to signal said pass device to operate in said current regulation state when said over-current condition is detected;
   a fast current limiter circuit coupled to said control device for limiting the flow of current through said pass device, said fast current limiter circuit being operable to cause said pass device to limit the flow of current in response to a high-current condition before said high-current sensing circuit signals the presence of an over-current condition to said control device, said fast current limiter circuit also being operable to cause said pass device to limit the flow of current in response to a high-voltage condition before said high-voltage sensing circuit signals the presence of an over-voltage condition to said control device; and an energy storage circuit coupled to said pass device, said energy storage circuit being operable to supply energy to the load when said pass device is in said off state.

* * * * *